(12) United States Patent
Chang et al.

(10) Patent No.: US 9,003,459 B1
(45) Date of Patent: *Apr. 7, 2015

(54) CONTENT SEQUENCE TECHNOLOGY

(71) Applicant: PurpleComm Inc., Santa Clara, CA (US)

(72) Inventors: Jack H. Chang, Saratoga, CA (US); William H. Sheu, Fremont, CA (US); Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/846,004

(22) Filed: Mar. 18, 2013

Related U.S. Application Data

(63) Continuation of application No. 12/795,270, filed on Jun. 7, 2010, now Pat. No. 8,402,495.

(51) Int. Cl.
*H04N 7/173* (2011.01)
*H04N 21/266* (2011.01)

(52) U.S. Cl.
CPC .................... *H04N 21/266* (2013.01)

(58) Field of Classification Search
CPC .............................................. H04N 21/47202
USPC ............................ 725/93–95, 116
See application file for complete search history.

(56) References Cited

U.S. PATENT DOCUMENTS

| 7,089,579 | B1 | 8/2006 | Mao et al. |
| 7,225,456 | B2 | 5/2007 | Kitsukawa et al. |
| 2002/0184634 | A1 | 12/2002 | Cooper |
| 2003/0110503 | A1 | 6/2003 | Perkes |
| 2003/0221197 | A1 | 11/2003 | Fries et al. |
| 2005/0081244 | A1 | 4/2005 | Barrett et al. |
| 2006/0075428 | A1 | 4/2006 | Farmer et al. |
| 2007/0277219 | A1 | 11/2007 | Toebes et al. |
| 2008/0022320 | A1 | 1/2008 | Ver Steeg |
| 2008/0115182 | A1 | 5/2008 | van Willigenburg |
| 2009/0133059 | A1* | 5/2009 | Gibbs et al. ..................... 725/34 |
| 2010/0325650 | A1* | 12/2010 | Ellis et al. ........................ 725/25 |

OTHER PUBLICATIONS

U.S. Non-Final Office Action for U.S. Appl. No. 12/795,270 dated Apr. 25, 2012, 14 pages.
U.S. Notice of Allowance for U.S. Appl. No. 12/795,270 dated Nov. 15, 2012, 7 pages.

* cited by examiner

*Primary Examiner* — Hunter B Lonsberry
(74) *Attorney, Agent, or Firm* — Fish & Richardson P.C.

(57) ABSTRACT

Content sequence technology, in which a channel subscribed to by a user of a content delivery network is identified and a genre of the identified channel is determined. A play sequence policy is selected for the identified channel based on the determined genre. The play sequence policy defines one or more rules used in determining an order to play content files on the identified channel. Display of the identified channel is controlled based on the selected play sequence policy.

20 Claims, 15 Drawing Sheets

800

```
┌─────────────────────────────────────────────┐
│  RECEIVE, FROM A CONTENT CURATOR,           │
│  INPUT DEFINING A PLAY SEQUENCE POLICY      │
│  FOR A CHANNEL                              │
│                                      802    │
└─────────────────────────────────────────────┘
                      │
                      ▼
┌─────────────────────────────────────────────┐
│  ACCESS, FOR A USER THAT SUBSCRIBES TO THE CHANNEL, USER │
│  PROFILE DATA THAT DEFINES PLAY SEQUENCE PREFERENCES OF  │
│  THE USER                                   │
│                                      804    │
└─────────────────────────────────────────────┘
                      │
                      ▼
┌─────────────────────────────────────────────┐
│  COMPARE THE PLAY SEQUENCE POLICY DEFINED FOR THE        │
│  CHANNEL BY THE CONTENT CURATOR TO THE PLAY SEQUENCE     │
│  PREFERENCES OF THE USER                    │
│                                      806    │
└─────────────────────────────────────────────┘
                      │
                      ▼
┌─────────────────────────────────────────────┐
│  DETERMINE A PLAY SEQUENCE POLICY FOR THE USER FOR THE   │
│  CHANNEL BASED ON THE COMPARISON            │
│                                      808    │
└─────────────────────────────────────────────┘
```

FIG. 8

CONTENT SEQUENCE TECHNOLOGY

CROSS-REFERENCE TO RELATED APPLICATION

This application is a continuation (and claims the benefit of priority under 35 USC 120) of U.S. application Ser. No. 12/795,270, filed Jun. 7, 2010, now allowed. The disclosure of the prior application is considered part of (and is incorporated by reference in) the disclosure of this application.

FIELD

The present disclosure generally relates to content sequence technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of controlling sequence of content included in a channel includes identifying a channel subscribed to by a user of a content delivery network, determining a genre of the identified channel, and selecting, from among multiple, different play sequence policies, a play sequence policy for the identified channel based on the determined genre of the identified channel. The play sequence policy defines one or more rules used in determining an order to play content files on the identified channel. The method also includes controlling display of the identified channel based on the selected play sequence policy.

Implementations may include one or more of the following features. For example, the method may include selecting a latest content policy defining a rule that content files that have been available for a relatively short period of time are played prior to content files that have been available for a relatively long period of time. The method also may include an oldest content policy defining a rule that content files that have been available for a relatively long period of time are played prior to content files that have been available for a relatively short period of time. The method further may include selecting an oldest download policy defining a rule that content files that have been downloaded to a downloader device for a relatively long period of time are played prior to content files that have been downloaded to the downloader device for a relatively short period of time.

In some implementations, the method may include determining a genre from among a news genre, a television show genre, and a movies genre. In these implementations, the method may include selecting a latest content policy when the determined genre is the news genre. The latest content policy may define a rule that news programs that have been available for a relatively short period of time are played prior to news programs that have been available for a relatively long period of time. The method also may include selecting an oldest content policy when the determined genre is the television show genre. The oldest content policy may define a rule that television shows that have been available for a relatively long period of time are played prior to television shows that have been available for a relatively short period of time. The method further may include selecting an oldest download policy when the determined genre is the movies genre. The oldest download policy may define a rule that movies that have been downloaded to a downloader device for a relatively long period of time are played prior to movies that have been downloaded to the downloader device for a relatively short period of time.

In some examples, the method may include receiving, from a content curator, input defining a particular play sequence policy for a particular channel and accessing, for a user that subscribes to the particular channel, user profile data that defines play sequence preferences of the user. In these examples, the method may include comparing the particular play sequence policy defined for the particular channel by the content curator to the play sequence preferences of the user and determining a user play sequence policy for the user for the particular channel based on the comparison.

In addition, the method may include modifying the particular play sequence policy defined for the particular channel by the content curator when the comparison reveals that the play sequence preferences of the user differ from the particular play sequence policy. The method also may include determining a user play sequence policy for the user for the particular channel using the play sequence preferences of the user and breaking ties in the determined user play sequence policy based on the particular play sequence policy defined for the particular channel by the content curator.

In some implementations, the method may include accessing, for the user that subscribes to the particular channel, user profile data that includes play sequence preferences defined by the user and default play sequence settings automatically set for the user and comparing the particular play sequence policy defined for the particular channel by the content curator to the play sequence preferences defined by the user and the default play sequence settings automatically set for the user. In these implementations, the method may include identifying one or more instances in which the comparison reveals that the play sequence preferences defined by the user differ from the particular play sequence policy and identifying one or more instances in which the comparison reveals that the default play sequence settings automatically set for the user differ from the particular play sequence policy. Further, in these implementations, the method may include modifying the particular play sequence policy based on the play sequence preferences defined by the user for the one or more instances in which the comparison reveals that the play sequence preferences defined by the user differ from the particular play sequence policy and maintaining the particular play sequence policy for the one or more instances in which the comparison reveals that the default play sequence settings automatically set for the user differ from the particular play sequence policy.

In some examples, the method may include determining a play sequence for the identified channel for the user using the selected play sequence policy, receiving, from the user, input defining one or more play sequence modifications for the identified channel for the user, modifying the play sequence determined using the selected play sequence policy based on the input received from the user defining the one or more play sequence modifications, and controlling display of the identified channel based on the modified play sequence. In these examples, the method may include receiving, from the user, input rearranging an order of content files included in the identified channel and changing the play sequence determined using the selected play sequence policy to reflect the rearranged order of content files included in the identified channel.

The method may include monitoring play sequence changes made by a user over time by genre and, based on the monitoring, tracking data descriptive of the play sequence changes made by the user over time by genre. The method also may include inferring play sequence preferences for the user by genre based on the tracked data descriptive of the play sequence changes made by the user over time by genre and controlling at least one play sequence policy for the user based on the inferred play sequence preferences.

In some examples, the method may include identifying a particular play sequence policy defined for the user for a particular genre and comparing the particular play sequence policy defined for the user for the particular genre with the inferred play sequence preferences for the user for the particular genre. In these examples, the method may include, based on the comparison, determining whether the particular play sequence policy defined for the user for the particular genre corresponds to the inferred play sequence preferences for the user for the particular genre and, in response to a determination that the particular play sequence policy defined for the user for the particular genre does not correspond to the inferred play sequence preferences for the user for the particular genre, suggesting that the user change the particular play sequence policy defined for the user for the particular genre to a different play sequence policy that corresponds to the inferred play sequence preferences for the user for the particular genre.

In some implementations, the method may include identifying a particular play sequence policy defined for the user for a particular genre and comparing the particular play sequence policy defined for the user for the particular genre with the inferred play sequence preferences for the user for the particular genre. In these implementations, the method may include, based on the comparison, determining whether the particular play sequence policy defined for the user for the particular genre corresponds to the inferred play sequence preferences for the user for the particular genre and, in response to a determination that the particular play sequence policy defined for the user for the particular genre does not correspond to the inferred play sequence preferences for the user for the particular genre, automatically, without user intervention, changing the particular play sequence policy defined for the user for the particular genre to a different play sequence policy that corresponds to the inferred play sequence preferences for the user for the particular genre.

Further, the method may include tracking changes the user makes to order of content files included in channels that correspond to a particular genre and comparing the changes the user makes to order of content files included in channels that correspond to the particular genre with multiple play sequence policies. The method also may include, based on the comparison, determining whether the changes the user makes to order of content files included in channels that correspond to the particular genre correspond to a particular play sequence policy included in the multiple play sequence policies and inferring that the user prefers the particular play sequence policy for the particular genre in response to a determination that the changes the user makes to order of content files included in channels that correspond to the particular genre correspond to the particular play sequence policy.

In some examples, the method may include analyzing attributes of content files included in the identified channel with respect to the one or more rules defined by the selected play sequence policy and determining an order for playing the content files included in the identified channel based on the analysis of the attributes of content files included in the identified channel with respect to the one or more rules defined by the selected play sequence policy. In these examples, the method may include displaying an interface that includes representations of the content files included in the identified channel arranged in the determined order.

In some implementations, the method may include receiving a command to play the identified channel on a media device associated with the user and analyzing attributes of content files included in the identified channel with respect to the one or more rules defined by the selected play sequence policy. In these implementations, the method may include, in response to receiving the command to play the identified channel on the media device associated with the user, selecting, from among the content files included in the identified channel, a first content file included in the identified channel to play on the media device associated with the user based on the analysis of the attributes of the content files included in the identified channel with respect to the one or more rules defined by the selected play sequence policy and initiating playing of the first content file on the media device associated with the user. Further, in these implementations, the method may include detecting ending of the first content file on the media device associated with the user and, in response to detecting ending of the first content file on the media device associated with the user, selecting, from among the content files included in the identified channel, a next content file included in the identified channel to play on the media device associated with the user based on an analysis of attributes of the content files included in the identified channel with respect to the one or more rules defined by the selected play sequence policy and automatically, without human intervention, initiating playing of the next content file on the media device associated with the user after playing of the first content file on the media device associated with the user ends.

In another aspect, a system includes at least one computer and at least one computer-readable medium coupled to the at least one computer having instructions stored thereon which, when executed by the at least one computer, causes the at least one computer to perform operations. The operations include identifying a channel subscribed to by a user of a content delivery network, determining a genre of the identified channel, and selecting, from among multiple, different play sequence policies, a play sequence policy for the identified channel based on the determined genre of the identified channel. The play sequence policy defines one or more rules used in determining an order to play content files on the identified channel. The operations also include controlling display of the identified channel based on the selected play sequence policy.

In yet another aspect, at least one computer-readable storage medium is encoded with at least one computer program comprising instructions that, when executed, operate to cause a computer to perform operations. The operations include identifying a channel subscribed to by a user of a content delivery network, determining a genre of the identified channel, and selecting, from among multiple, different play sequence policies, a play sequence policy for the identified channel based on the determined genre of the identified channel. The play sequence policy defines one or more rules used in determining an order to play content files on the identified channel. The operations also include controlling display of the identified channel based on the selected play sequence policy.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3, 6, 7, 8, 11, and 12 are flowcharts of exemplary processes.

Like reference numbers represent corresponding parts throughout.

DETAILED DESCRIPTION

Figure 1:
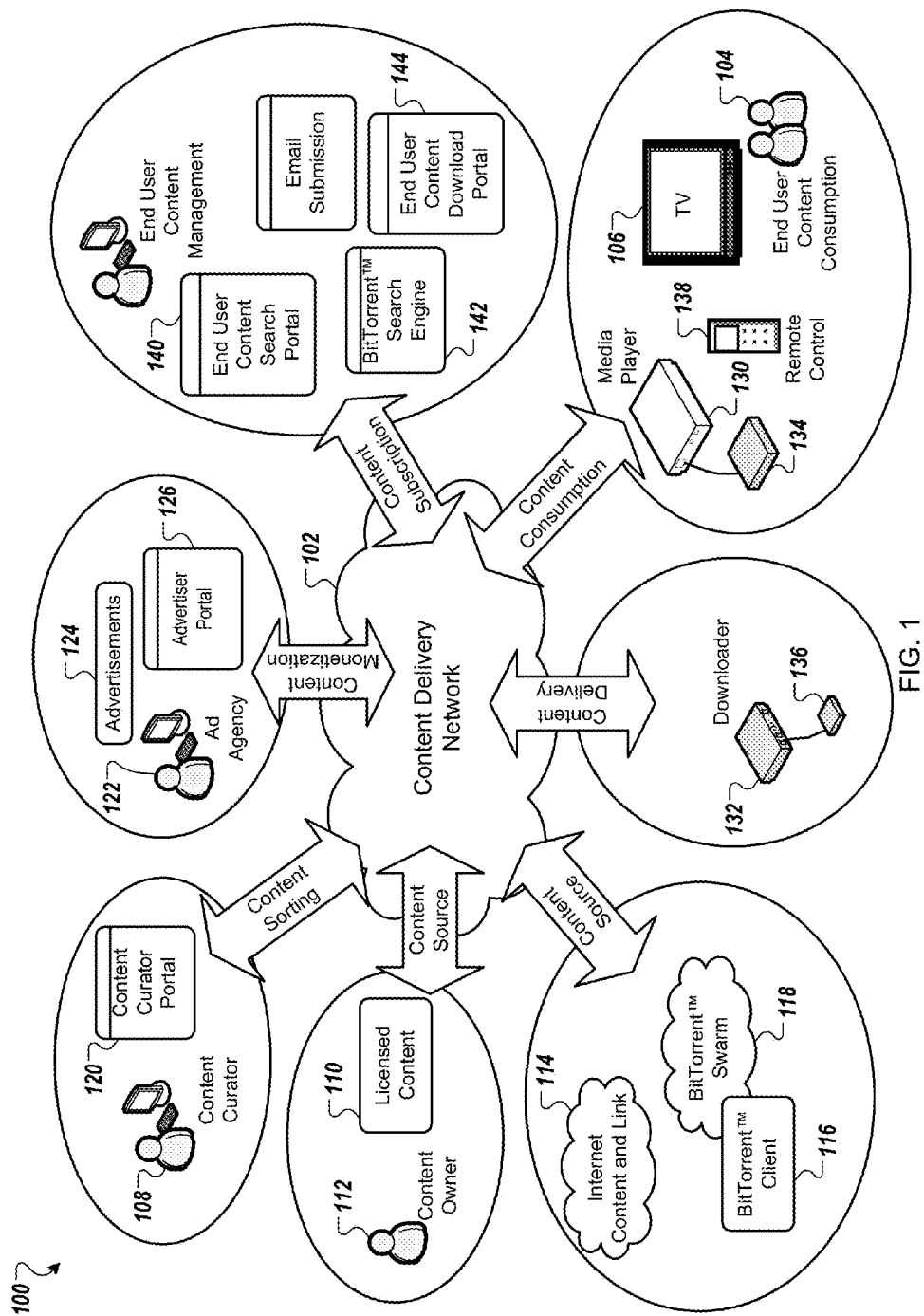
FIGS. 1, 2, and 15 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTNT™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134,136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
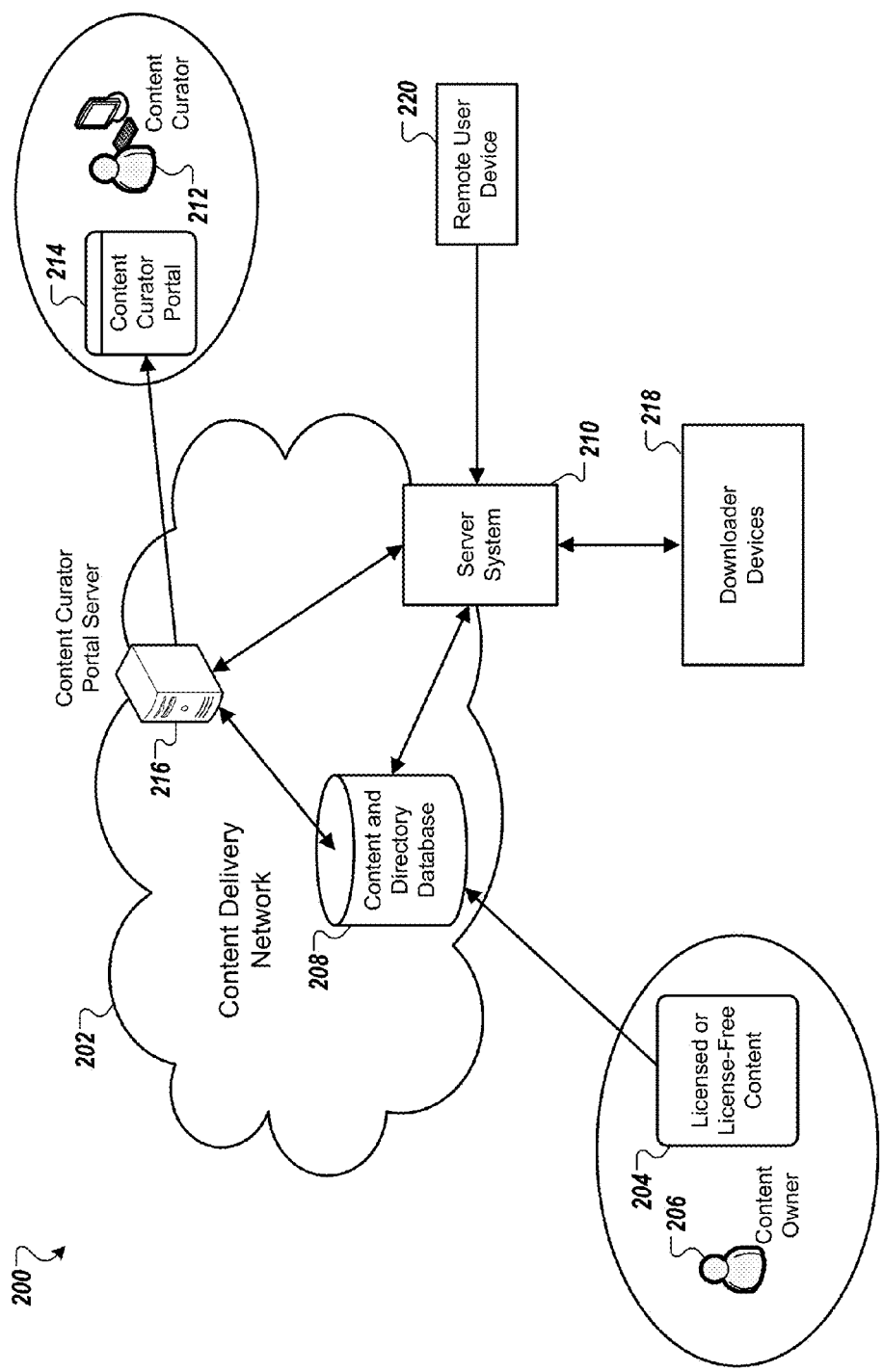

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implementations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTNT™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

Figure 3:
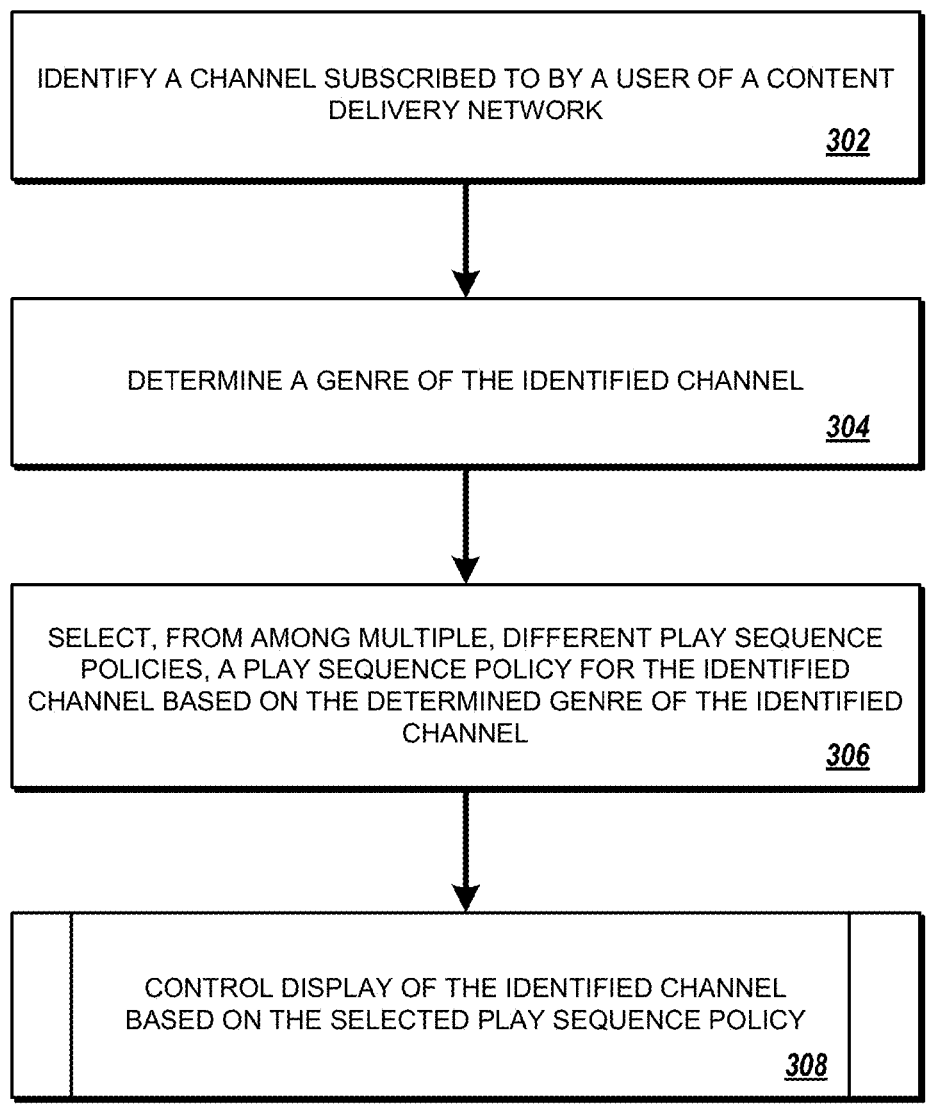

FIG. 3 illustrates a process 300 for controlling display of a channel based on a play sequence policy. The operations of the process 300 are described generally as being performed by the system 200. The operations of the process 300 may be performed by one of the components of the system 200 (e.g., the server system 210) or may be performed by a combination of the components of the system 200. In some implementations, operations of the process 300 may be performed by one or more processors included in one or more electronic devices.

The system 200 identifies a channel subscribed to by a user of a content delivery network (302). For example, a channel may be identified in response to a user selecting a channel. A user may select a channel, for example, by pressing a button on a remote control device to indicate a channel number (e.g., "3") corresponding to a selected channel. A user may select a channel to watch the channel, or the user may select the channel to perform some other action, such as to view information about the channel or to configure the channel. The user may select a channel from a list of subscribed channels. A user may select a channel on a user interface displayed on a television screen (e.g., the same screen that the user uses to view content), or the user may select a channel (e.g., to configure the channel) on a user interface displayed on a computing device (e.g., a display device may display an end user portal user interface which allows the user to configure subscribed channels).

Figure 4:
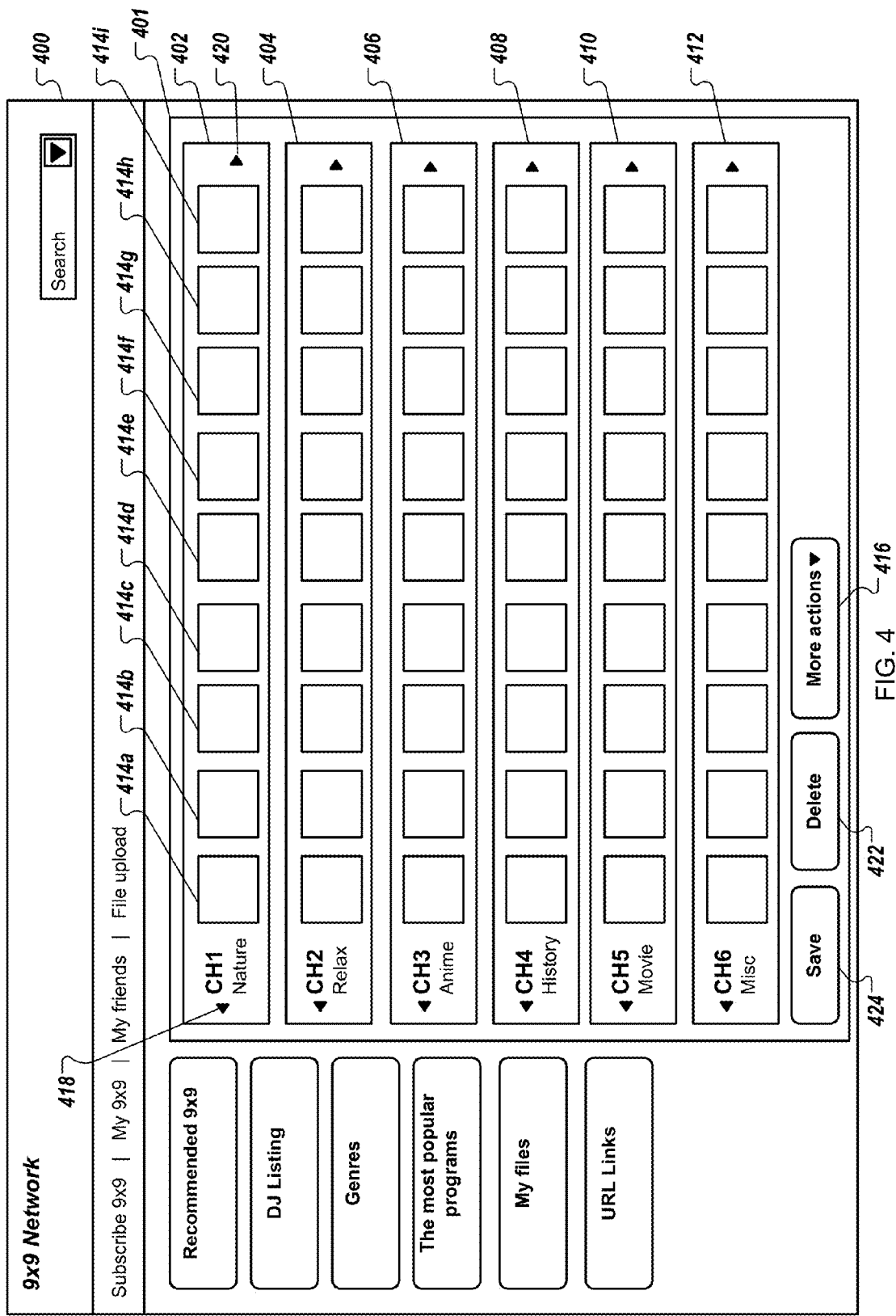
FIGS. 4, 9, and 14 are diagrams of exemplary user interfaces.

For example, FIG. 4 illustrates a user interface 400 which includes a channel list area 401. The channel list area 401 includes channel areas 402-412 which correspond to, for example, a nature channel ("Ch1"), a relaxation channel ("Ch2"), an animation channel ("Ch3"), a history channel ("Ch4"), a movie channel ("Ch5"), and a miscellaneous channel ("Ch6"), respectively. Each channel area 402-412 includes a list of content representations. For example, the channel area 402 includes content representations 414a-414i. As will be described in more detail below, the user may use the user interface 400 to configure a channel, such as to change the presentation order of content items within a channel.

The system 200 may identify a channel if the channel appears in a user interface. For example, the channel list area 401 may currently be displaying some but not all of the user's subscribed channels (e.g., the user may be able to view their other channels by scrolling or by selecting a "more actions" control 416. The system 200 may identify those channels which are displayed in the channel list area 401. The system 200 may also identify a channel if a user selects a channel on a user interface. For example, the user may select one of the channel list areas 402-412 to navigate to a detail view corresponding to the selected channel, or the user may implicitly select a channel by selecting a particular content representation (e.g., 414) in one of the channel list areas 402-412.

Returning to FIG. 3, the system 200 determines a genre of the identified channel (304). A channel's genre may be, for example, news, sports, movies, entertainment, politics, etc. A channel may have associated metadata which indicates a genre for the channel. A content curator may define a channel's genre, for example, using a content curator portal. A genre may be determined in other ways, such as by parsing the channel's title or description and comparing words in the title or description to a list of keywords which are each associated with a particular genre (e.g., if a channel has "sports", "baseball", "football", "NFL" (National Football League), or other sports-related words in the title, a genre of "sports" may be determined for the channel.

Figure 5:
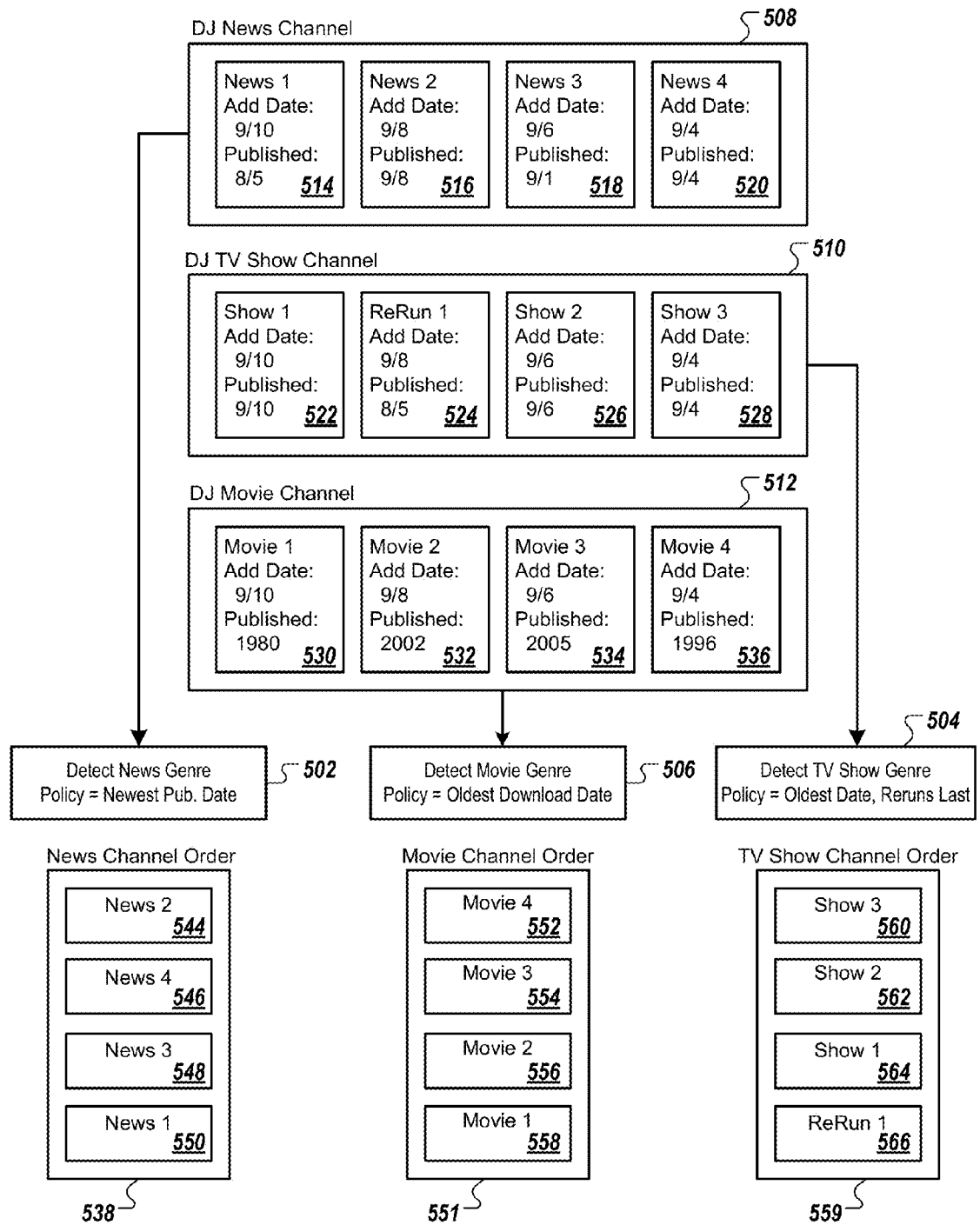
FIGS. 5, 10, and 13 illustrate exemplary play sequence policies.

The system 200 selects, from among multiple, different play sequence policies, a play sequence policy for the identified channel based on the determined genre of the identified channel (306). A play sequence policy defines one or more rules which control the presentation order of content within a channel. For example, FIG. 5 illustrates play sequence policies 502, 504, 506 for channels 508, 510, 512, respectively. The channel 508 is a news channel with news content items 514-520 ("News 1" to "News 4", respectively), the channel 510 is a television show channel with television show content items 522-528 ("Show 1", "ReRun 1", "Show 2", "Show 3", respectively), and the channel 512 is a movie channel with movie content items 530-536 ("Movie 1" to "Movie 4", respectively). Each of the content items 514-520, 522-528, and 530-536 have associated metadata, including, among other things, a corresponding add date (e.g., download date), and publication date.

The policy 502 states that the content items 514-520 for the news channel 508 should be ordered by publication date, with the most recently published content items displayed first. For example, a content list 538 presented to a user may show the content items 514-520 in a publication-date order of "News 2", "News 4", "News 3", "News 1", as illustrated by representations 544-550, based on the policy 502. The policy 506 states that the content items 530-536 for the movie channel 512 should be ordered by download date, with the least-recently downloaded content items displayed first. For example, a content list 551 shows the content items 530-536 in a download-date order of "Movie 4", "Movie 3", "Movie 2", "Movie 1", as illustrated by representations 552-558, based on the policy 506.

The policy 504 states that the content items 522-528 for the television show channel 510 should be ordered by publication date, with the least-recently published content items displayed first, with an added condition that reruns should be displayed last. For example, reruns may be displayed after non-reruns, with the reruns sorted together by oldest publication date. A content list 559 shows the content items 528,

526, and 522 in a publication-date order of "Show 3", "Show 2", "Show 1", as illustrated by representations 560-564. The content item 524 corresponding to the "ReRun 1" content is displayed last in the content list 559, as illustrated by representation 566. If the policy 504 did not include a condition for rerun content, the content item 524 would be displayed first in the content list 559, since the content item 524 has the oldest publication date among the content items 522-528.

The system 200 may select a play sequence policy from one or more play sequence policies which apply to the identified channel. For example, a content curator may define a play sequence policy specifically for the identified channel or a content curator may define a play sequence policy which generally applies to the genre of the identified channel. The user may also define play sequence policies. For example, the user may define a play sequence policy for the identified channel or for the genre of the identified channel. As another example, a default play sequence policy may be defined for a particular genre if there are no content curator or user policies defined which are applicable to the genre. A default play sequence policy may also be defined for identified channels which do not have an associated genre. The system 200 may compare multiple applicable play sequence policies (e.g., download-jockey-defined policies, user-defined policies, default policies) and may select a play sequence policy based on the comparison. Selecting a play sequence policy is described in more detail below with respect to FIG. 8.

Returning to FIG. 3, the system 200 controls display of the identified channel based on the selected play sequence policy (308). For example, if the identified channel corresponds to a channel the user has selected for content viewing, the system 200 may select a first content file to view based on the selected play sequence policy, and upon completion of the first content file, may select subsequent content files for viewing based on the selected play sequence policy. If the identified channel corresponds to a channel displayed on a user interface, representations of the content files included in the channel may be arranged and displayed on the user interface in an order based on the selected play sequence policy. Controlling the display of the identified channel based on the selected play sequence policy is described in more detail below with respect to FIGS. 6 and 7.

Figure 6:
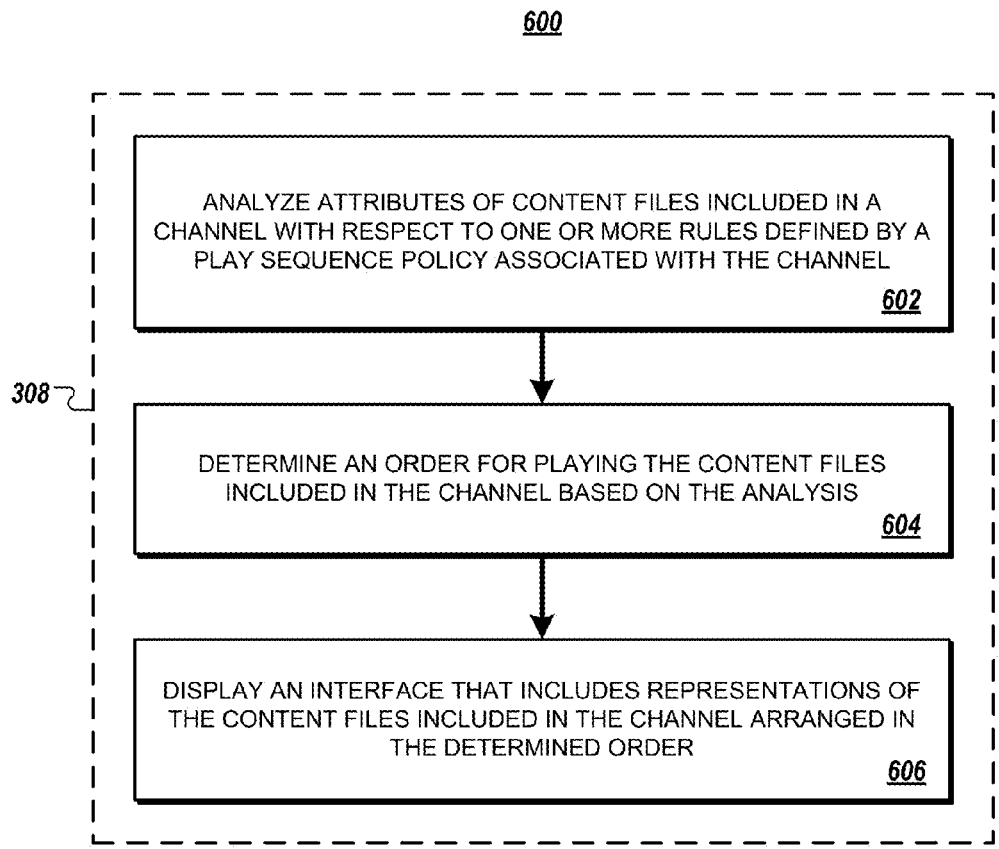

FIG. 6 illustrates a process 600 for controlling display of a channel based on a play sequence policy. The process 600 may used in controlling display of the identified channel referenced above with respect to reference numeral 308. The operations of the process 600 are described generally as being performed by the system 200. The operations of the process 600 may be performed by one of the components of the system 200 (e.g., the server system 210) or may be performed by a combination of the components of the system 200. In some implementations, operations of the process 600 may be performed by one or more processors included in one or more electronic devices.

The system 200 analyzes attributes of content files included in a channel with respect to one or more rules defined by a play sequence policy associated with the channel (602). For example, the system 200 may analyze attributes which have a data type which is comparable, such as date, character, or numeric data types. Attributes can include publication date, download date, modification date, run length, content size (e.g., as stored on disk), and reviewer rating score, to name a few examples. An attribute may correspond to a Boolean condition, such as whether a content item is a rerun content item, or whether a content item is "recommended" (e.g., by a friend, or by a content curator).

The system 200 determines an order for playing the content files included in the channel based on the analysis (604). For example, an order may be determined by sorting the content files according to an attribute and a sort direction. For example, content items may be sorted by oldest publication date, newest publication date, oldest download date, newest download date, longest run length, shortest run length, largest content size, smallest content size, highest average reviewer rating score, lowest average reviewer rating score, etc. Other examples may include ordering non-rerun content before rerun content, or ordering recommended content before non-recommended content.

The system 200 displays an interface that includes representations of the content files included in the channel arranged in the determined order (606). For example, the interface 400 (FIG. 4) may be displayed. For each of the channel areas 402-412, representations of content files in a particular channel area 402-412 may be arranged in the order determined by the play sequence policy. For example, the representations 414*a*-414*i* for the channel 402 may be arranged in a newest-publication-date-first order.

Figure 7:
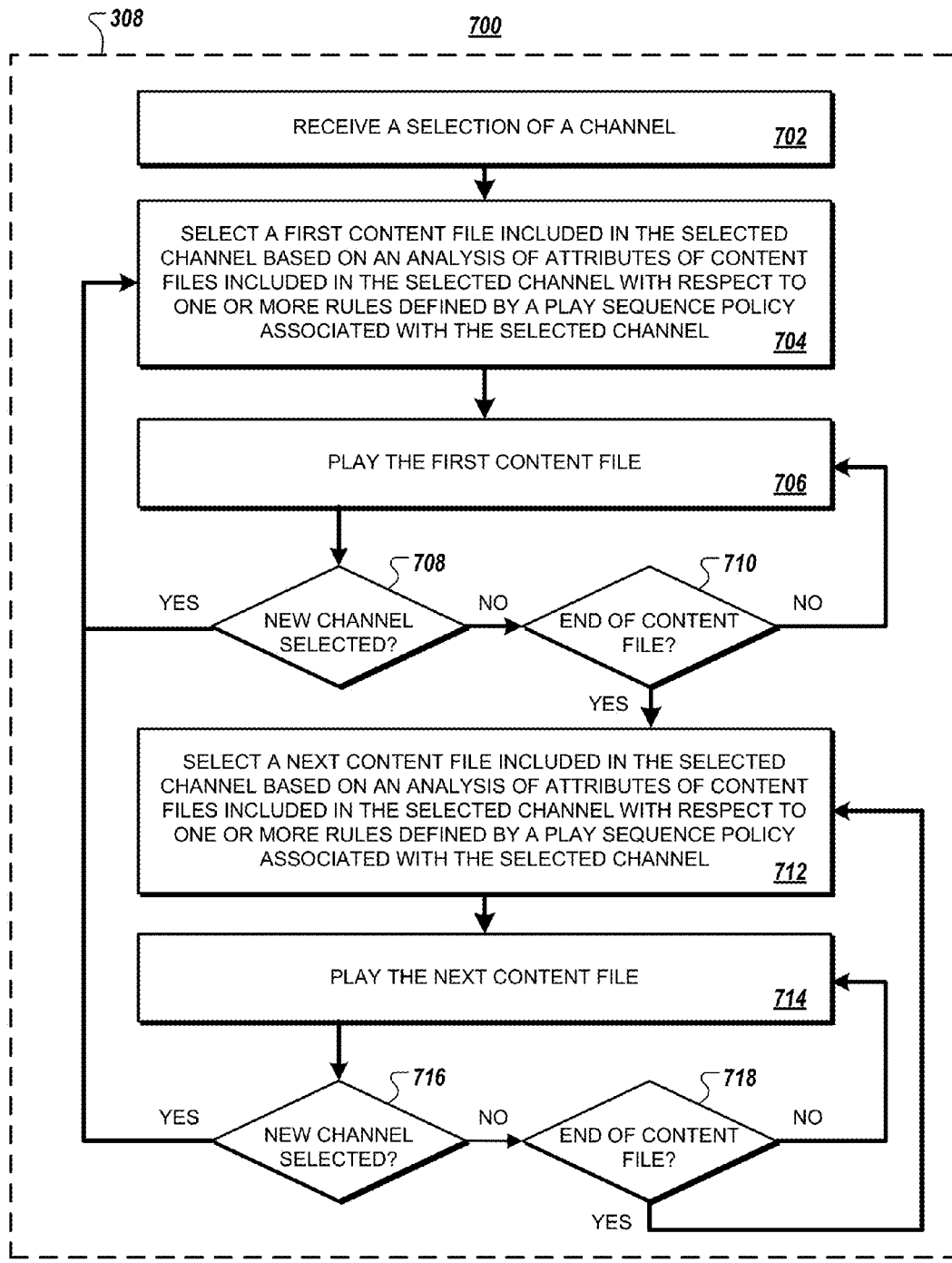

FIG. 7 illustrates a process 700 for controlling display of a channel based on a play sequence policy. The process 700 may used in controlling display of the identified channel referenced above with respect to reference numeral 308. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 receives a selection of a channel (702). For example, a user may press a button on a remote control device indicating selection of a channel number corresponding to a selected channel. As another example, the user may select a representation of the channel (e.g., using a pointer or controller or other pointing device, or using a gesture) on an interface displayed on a display screen.

The system 200 selects a first content file included in the selected channel based on an analysis of attributes of content files included in the selected channel with respect to one or more rules defined by a play sequence policy associated with the selected channel (704). For example, a play sequence policy may define an order of content files based on sorting content files by one or more attributes, in a particular sort direction. For example, in general, content items may be sorted by oldest publication date, newest publication date, oldest download date, newest download date, longest run length, shortest run length, largest content size, smallest content size, highest average reviewer rating score, lowest average reviewer rating score, etc. As a particular example, if the play sequence policy defines a rule specifying that content is to be watched in order of oldest download date, the content file with the oldest download date among content files included in the selected channel may be selected.

The system 200 plays the first content file (706). For example, a media player device may retrieve the first content file (e.g., from a downloader device, or from electronic storage of the media player) and may render the content on a display screen (e.g., television screen, computer monitor).

The system 200 determines whether a new channel is selected (708). For example, while viewing the first content file, the user may select a different channel (e.g., using a remote control device). If a new channel is selected, the system 200 performs step 704 again (e.g., the system 200 selects a first content file included in the selected channel based on an analysis of attributes of content files included in the selected channel with respect to one or more rules defined by a play sequence policy associated with the selected channel).

If a new channel is not selected, the system 200 determines whether the end of the first content file has been reached (710). If the end of the first content file has not been reached, the system 200 continues to play the first content file (e.g., 706).

If the end of the first content file has been reached, the system 200 selects a next content file included in the selected channel based on an analysis of attributes of content files included in the selected channel with respect to one or more rules defined by a play sequence policy associated with the selected channel (712). For example, if the play sequence policy defines a rule specifying that content is to be watched in order of oldest download date, the content file with the second oldest download date among content files included in the selected channel may be selected.

The system 200 plays the next content file (714). For example, a media player device may retrieve the next content file (e.g., from a downloader device, or from electronic storage of the media player) and may render the content on a display screen (e.g., television screen, computer monitor).

The system 200 determines whether a new channel is selected (716). For example, while viewing the next content file, the user may select a different channel (e.g., using a remote control device). If a new channel is selected, the system 200 performs step 704 again (e.g., the system 200 selects a first content file included in the selected channel based on an analysis of attributes of content files included in the selected channel with respect to one or more rules defined by a play sequence policy associated with the selected channel).

If a new channel is not selected, the system 200 determines whether the end of the next content file has been reached (718). If the end of the next content file has not been reached, the system 200 continues to play the next content file (e.g., 714).

If the end of the next content file has been reached, the system 200 selects a new next content file included in the selected channel based on an analysis of attributes of content files included in the selected channel with respect to one or more rules defined by a play sequence policy associated with the selected channel (e.g., 712). For example, if the play sequence policy defines a rule specifying that content is to be watched in order of oldest download date, the content file with the third oldest download date among content files included in the selected channel may be selected.

FIG. 8 illustrates a process 800 for determining a play sequence policy. The operations of the process 800 are described generally as being performed by the system 200. The operations of the process 800 may be performed by one of the components of the system 200 (e.g., the server system 210) or may be performed by a combination of the components of the system 200. In some implementations, operations of the process 800 may be performed by one or more processors included in one or more electronic devices.

Figure 9:
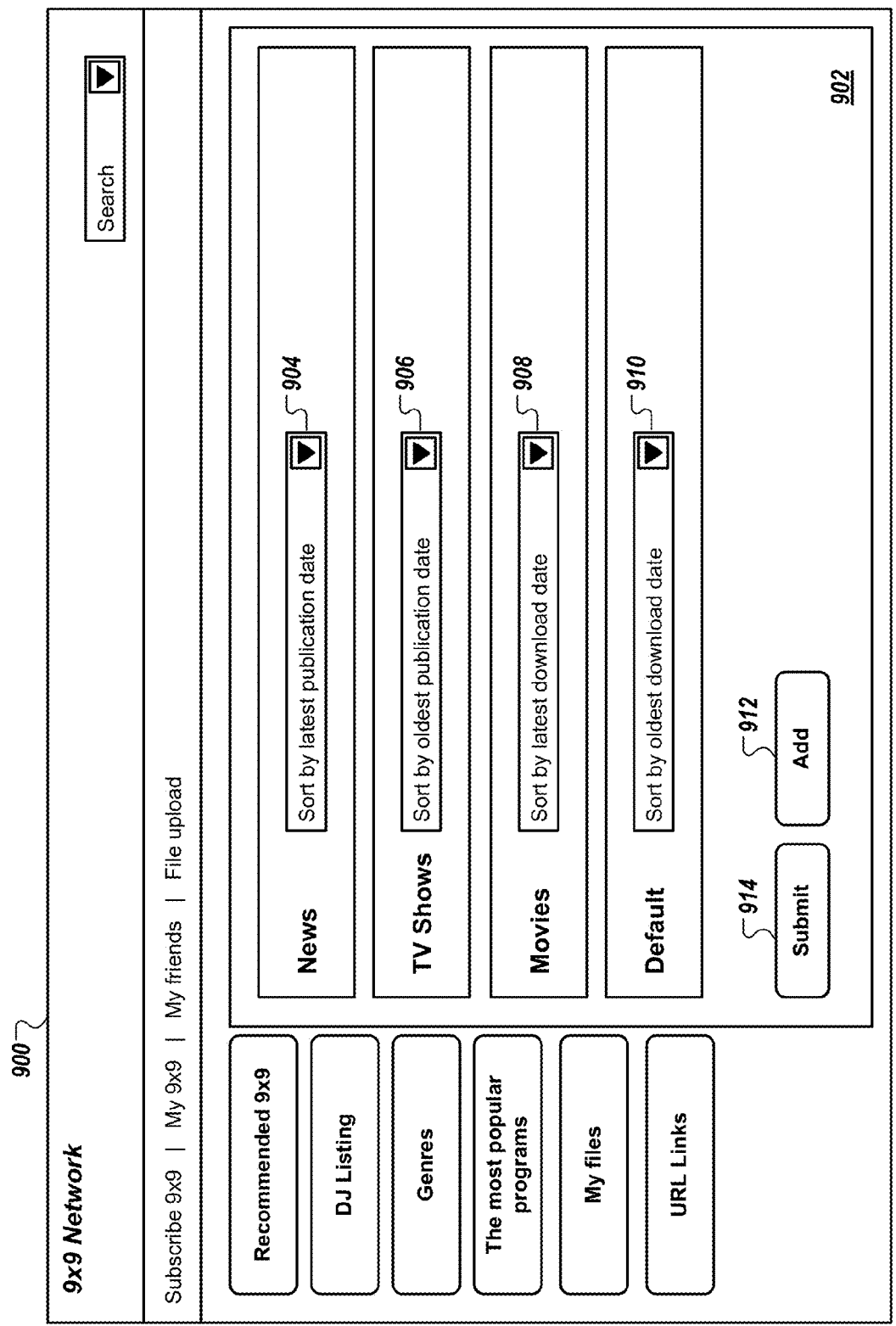

The system 200 receives, from a content curator, input defining a play sequence policy for a channel (802). A content curator may, for example, define a play sequence policy using an interface displayed in a content curator portal. For example, FIG. 9 illustrates a user interface 900 for defining one or more play sequence policies. The interface 900 may be used, for example, to define a policy specifically for a particular channel or to define a policy for a genre which may be applicable for channels of that genre. The interface 900 includes a policy area 902 which includes policy controls 904-910. The policy controls 904-908 may be used to define play sequence policies for news, television show, and movie genres, respectively. The policy control 910 may be used to define a play sequence policy applicable for channels which do not have an associated genre.

The content curator may expand a policy control 904-910 and select a policy rule from a list of available policy rules. For example, the content curator may select a "sort by latest publication date" policy rule using the policy control 904, a "sort by oldest publication date" rule using the policy control 906, a "sort by latest download date" rule using the policy control 908, or a "sort by oldest download date" rule using the policy control 910. The user interface 900 may include other controls which allow the content curator to define more complex rules, such as rules involving multiple criteria (e.g., first sort content files by latest download date, then order content files so that recommended content files are before non-recommended content files).

The content curator may select an add control 912 to add a new area to the interface 900 which may be used, for example, to add a new policy corresponding to a different genre or a particular channel. The content curator may select a submit control 914 to save the policy settings displayed in the user interface 900. Policy settings may be saved, for example, in association with the content curator and in association with a corresponding genre and/or channel, such as in a content and directory database.

Returning to FIG. 8, the system 200 accesses, for a user that subscribes to the channel, user profile data that defines play sequence preferences of the user (804). A user may define play sequence preferences using a user interface similar to the interface 900 (FIG. 9). A user may, for example, define play sequence preferences to override a play sequence policy defined by a content curator or to override a default play sequence policy. Some users may not have any user-defined play sequence preferences. For some users, the user may not have any play sequence preferences which are applicable to the channel (e.g., the user may have preferences for a news genre but might not have preferences for a sports genre).

The system 200 compares the play sequence policy defined for the channel by the content curator to the play sequence preferences of the user (806). For example, if there is a content curator play sequence policy applicable to the channel and user play sequence preferences applicable to the channel, the system 200 may compare the content curator play sequence policy and the user play sequence preferences. If there are user play preferences applicable to the channel but no download-jockey-defined play sequence policies applicable to the channel, the user play sequence preferences may be compared to a system-defined default play sequence policy.

The system 200 determines a play sequence policy for the user for the channel based on the comparison (808). For example, a play sequence preference for a user may override a download-jockey-defined play sequence policy. As another example, if there are no download-jockey-defined play sequence policies or user-defined play sequence preferences applicable to the channel, a default play sequence policy may be determined.

Figure 10:
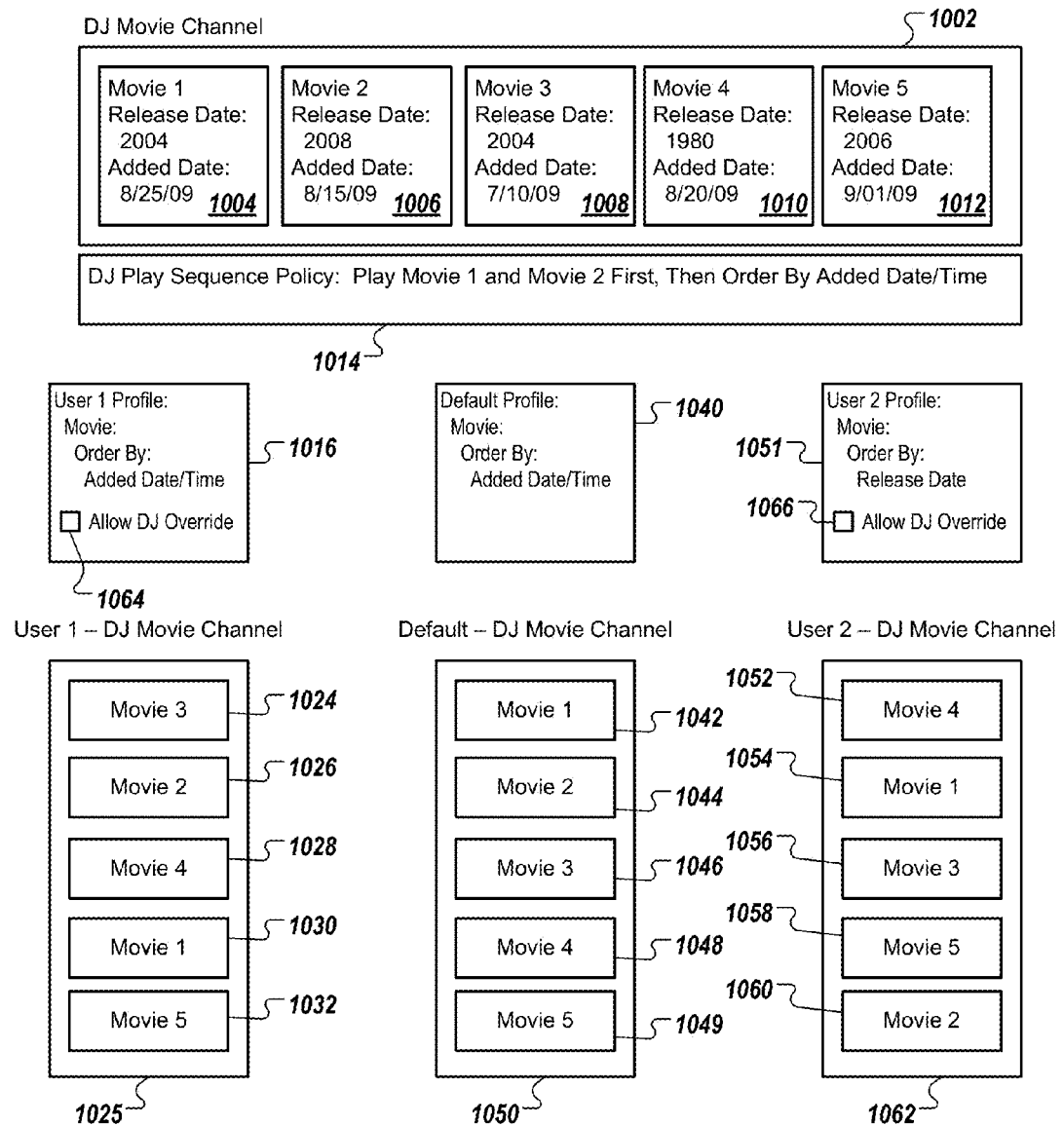

FIG. 10 illustrates a detailed example of comparing download-jockey-defined play sequence policies to user-defined play sequence preferences and of determining a play sequence policy based on the comparison. A movie channel 1002 includes content file representations 1004-1012 (corresponding to "Movie 1" to "Movie 5", respectively). Each of the content files associated with representations 1004-1012 have associated metadata, including, among other things, a corresponding add date (e.g., download date), and release date. A content curator has defined a play sequence policy 1014 which specifies that "Movie 1" and "Movie 2" should be played first, followed by remaining content files in added-date/time order. The channel 1002 is currently displaying the representations 1004-1012 in the order defined by the policy 1014.

A user profile 1016 for "user one" indicates that content files for channels of a movie genre (e.g., the channel 1002) should be ordered by added date/time. In some implementations, a user play sequence preference may override a content curator play sequence policy. For example, a content list 1025 for user one's view of the channel 1002 illustrates that "Movie 3" (e.g., shown as representation 1024), which has the oldest added date/time among "Movie 1" to "Movie 5", is presented first (e.g., adhering to the preference defined in the user one profile 1016 but overriding the content curator play sequence policy 1014). The content list 1025 shows (e.g., using representations 1026-1032) that the order of the remaining content files in added date/time order is "Movie 2", "Movie 4", "Movie 1", and "Movie 5", respectively.

A default profile 1040 indicates that content files for channels of a movie genre (e.g., the channel 1002) should be ordered by added date/time. The default profile 1040 may be used for users who do not have a user profile corresponding to a movie genre. The default profile 1040 may be compared to the content curator play sequence policy 1014. In some implementations, a download-jockey-defined policy may override a default policy and/or preferences defined in a default profile. For example, as indicated by representations 1042-1049, a content list 1050 displaying a default view of the channel 1002 displays the content files for the channel 1002 in an order of "Movie 1", "Movie 2", "Movie 3", "Movie 4", and "Movie 5", respectively, which matches the order defined by the content curator play sequence policy 1014.

A user profile 1051 for "user two" indicates that content files for channels of a movie genre (e.g., channel 1002) should be ordered by release date. The ordering by release date defined by the profile 1051 may override the rules defined in the content curator play sequence policy 1014 and preferences defined in the default profile 1040. For example, as illustrated by representations 1052-1060, a content list 1062 for user two's view of the channel 1002 illustrates a release-date order of "Movie 4", "Movie 1", "Movie 3", "Movie 5", and "Movie 2", respectively.

A user may allow their play sequence preferences to be overridden by a content curator play sequence policy. For example, users one and two may select controls 1064-1066, respectively, to allow a content curator play sequence policy (e.g., policy 1014) to override preferences in a respective user profile (e.g., 1016, 1051). The controls 1064-1066 may be displayed, for example, in a user interface displayed in a user interface portal which allows a user to define and edit user play sequence preferences.

In some situations, ordering of content for a user may be based on a combination of rules defined in a play sequence policy and in a user's profile. For example, if there is an ordering placement "tie" between two content files based on a user's play sequence preferences, the tie may be "broken" by referring to a content curator's play sequence policy, to determine whether the content curator's play sequence policy indicates that one content file should be ordered before the other content file. For example, when attempting to order the "Movie 1" and "Movie 3" content files for user two based on the user profile 1051, there is a tie, since each movie has a release date of the year two thousand four. The content curator play sequence policy 1014 may be accessed to determine, for user two, whether "Movie 1" should be played before or after "Movie 3". The condition in the content curator play sequence policy 1014 specifying that "Movie 1" should be played first may be used to determine that "Movie 1" should be played before "Movie 3".

Figure 11:
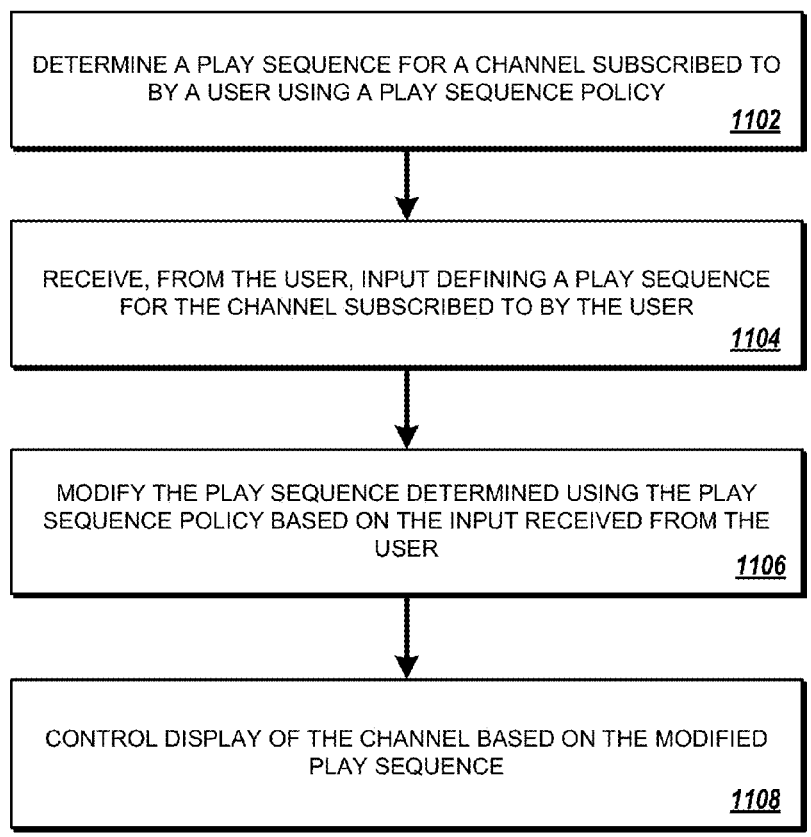

FIG. 11 illustrates a process 1100 for controlling display of a channel based on a modified play sequence. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

The system 200 determines a play sequence for a channel subscribed to by a user using a play sequence policy (1102). For example, the system 200 may select a play sequence policy defined by a content curator for the channel or for the genre of the channel. The system may also determine the play sequence based on a user's stored play sequence preferences.

The system 200 receives, from the user, input defining a play sequence for the channel subscribed to by the user (1104). For example, the user may define a play sequence using a user interface. The user interface may display representations of the content files included in the channel, with an initial arrangement matching an order determined by the play sequence policy. For example, the user interface 400 displays representations 414a-414i which represent content files for a "Ch1" channel. The user may reorder the content files to define a new play sequence. For example, the user may select a representation 414a-414i and "drag and drop" it to a different location. For example, the user may select the representation 414d, "drag" it so that it is between the representations 414a and 414b, and "drop" it, which may result in the moving of the representation 414d so that it is between the representations 414a and 414b.

The user may scroll to see additional content file representations using scroll buttons 418-420. The user may delete a content file from their view of the channel by selecting a representation 414a-414i and selecting a delete control 422. The user may save their changes to the play sequence by selecting a save control 424.

Returning to FIG. 11, the system 200 modifies the play sequence determined using the play sequence policy based on the input received from the user (1106). For example, the play sequence defined by the user may be stored in a database in association with the user.

The system 200 controls display of the channel based on the modified play sequence (1108). For example, the next time the user uses the interface 400, the order of the content representations for the channel (e.g., 414a-414i) may appear in an order corresponding to the modified play sequence. As another example, if the user watches the channel, content may be presented on the channel in an order corresponding to the modified play sequence.

Figure 12:
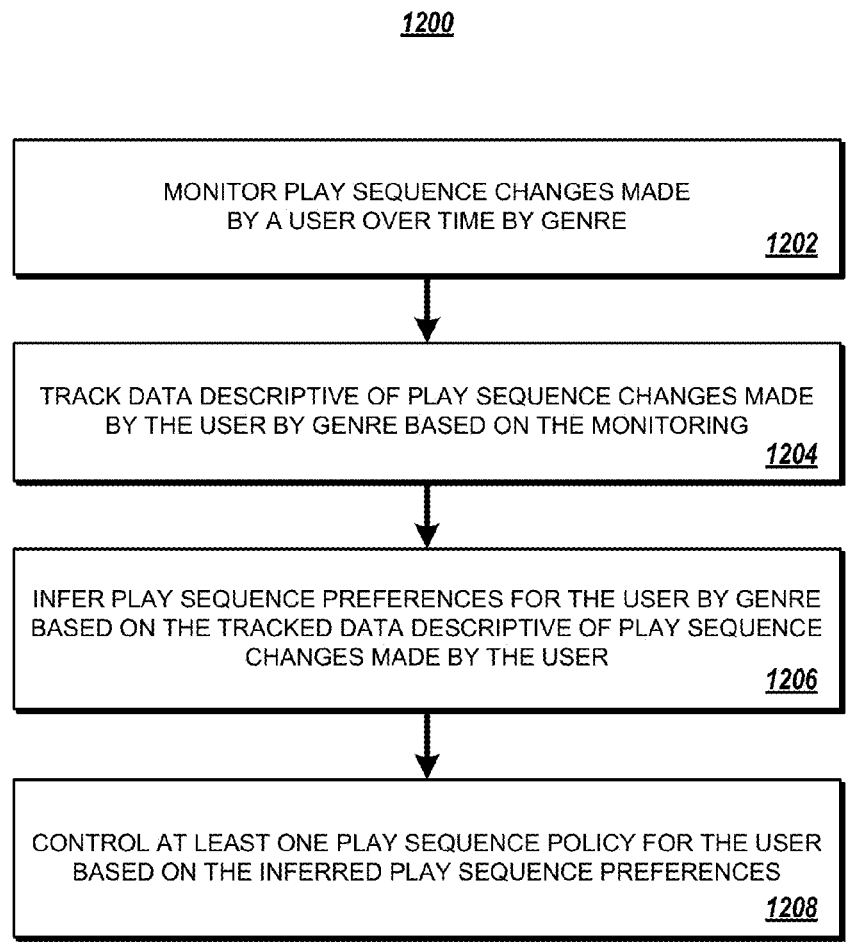

FIG. 12 illustrates a process 1200 for controlling one or more play sequence policies based on inferred play sequence preferences. The operations of the process 1200 are described generally as being performed by the system 200. The operations of the process 1200 may be performed by one of the components of the system 200 (e.g., the server system 210) or may be performed by a combination of the components of the system 200. In some implementations, operations of the process 1200 may be performed by one or more processors included in one or more electronic devices.

The system 200 monitors play sequence changes made by a user over time, by genre (1202). For example, the system 200 may monitor play sequences changes made by a user using the interface 400. As another example, the system 200 may monitor the user's changes to play sequences preferences of the user's profile. The system 200 may monitor other changes, such as a user's sorting actions performed on other views of the content for a channel (e.g., a content list displayed on a television screen).

The system 200 tracks data descriptive of play sequence changes made by the user by genre based on the monitoring (1204). For example, the system 200 may store, in a database, in association with the user, data descriptive of play sequence changes made by the user using the interface 400 or data descriptive of changes made to play sequence preferences of the user's profile, organized by genre.

Figure 13:
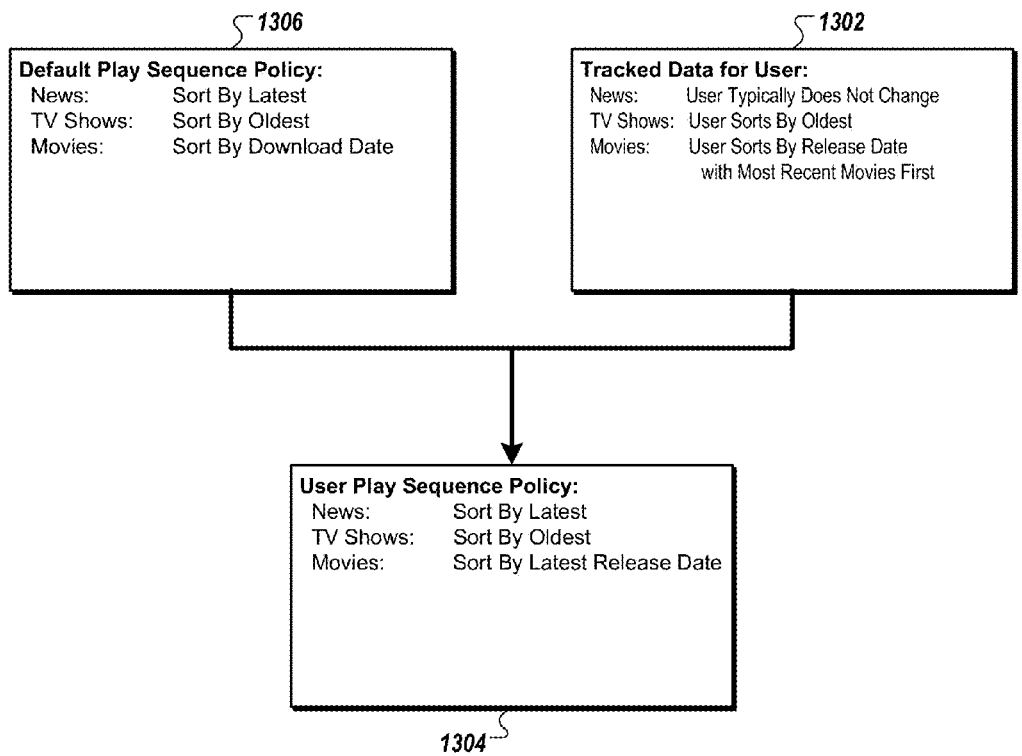

The system 200 infers play sequence preferences for the user by genre based on the tracked data descriptive of play sequence changes made by the user (1206). For example, FIG. 13 illustrates tracked data 1302 descriptive of play sequence changes made by a user. The tracked data 1302 indicates that the user typically does not change the play sequence for channels of a news genre, that the user typically sorts television show content by oldest publication date, and that the user typically sorts movie content by latest release date.

The system 200 may also infer play sequence preferences based on tracked data descriptive of changes the user made to the order of content files included in channels that correspond to a particular genre. For example, the system 200 may compare the changes the user makes to the order of content files included in channels of a particular genre with multiple play sequence policies. The system 200 may determine, based on the comparison, that the changes the user made to the order of the content files correspond to a particular play sequence policy and may consequently infer that the user prefers the particular play sequence policy.

Returning to FIG. 12, the system 200 controls at least one play sequence policy for the user based on the inferred play sequence preferences (1208). For instance, in the example of FIG. 13, a play sequence policy 1304 may be modified based on the inferred user preferences of sorting television show content by oldest publication date and sorting movie content by latest release date. The modifications to the user play sequence policy 1304 may be based on whether the inferred play sequence preferences differ from preferences stored in a default play sequence policy 1306. For example, the inferred play sequence preference of sorting television show content by oldest publication date matches a corresponding preference in the default play sequence policy 1306. However, the inferred play sequence preference of sorting movies by latest release date is different than the preference stored in the default play sequence policy 1306 of sorting movie content by download date. Therefore, the user play sequence policy 1304 is controlled to include a preference of sorting movie content by latest release date, to correspond to the inferred preference for the user.

Figure 14:
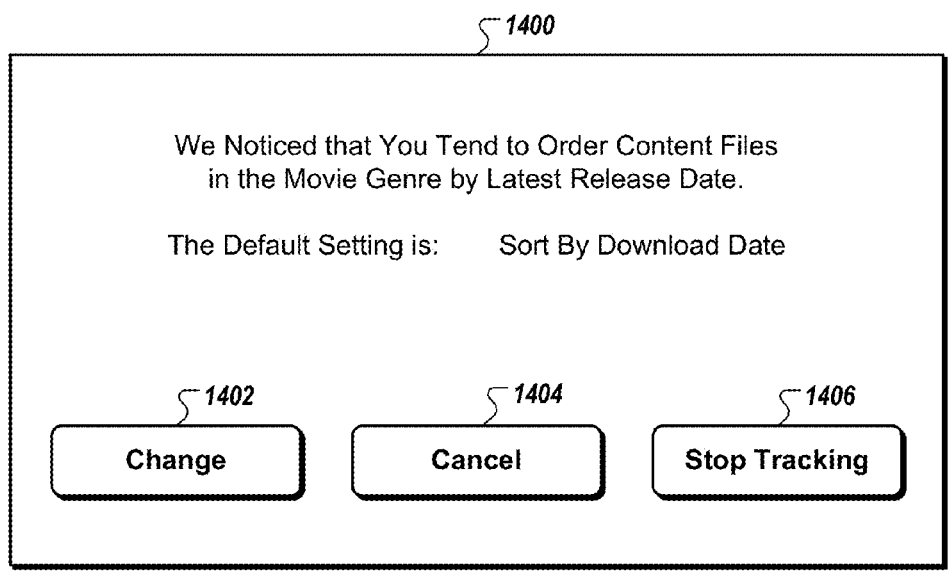

In some implementations, a play sequence policy defined for a user is automatically changed, without human intervention, to a different play sequence policy that corresponds to the inferred play sequence preferences. In other implementations, a user may be prompted before a play sequence policy for the user is controlled based on inferred play sequence preferences. For example, FIG. 14 illustrates a user interface 1400 which informs the user that they tend to order content files in the movie genre by latest release date and that the default setting is to sort content files in the movie genre by download date. The user may select a change control 1402 to change their default setting (e.g., in a play sequence policy for the user) to sort movie content by latest release date. The user may select a cancel control 1404 to dismiss the user interface 1400 without changes being made to their play sequence policy. The user may select a stop tracking control 1406 to stop the tracking of play sequence changes by the user. In some implementations, all tracking for the user is stopped, and in other implementations, only the tracking corresponding to the displayed message is stopped. In some implementations, the user may be able to specify whether all tracking or whether only the tracking corresponding to the displayed message is stopped.

Figure 15:
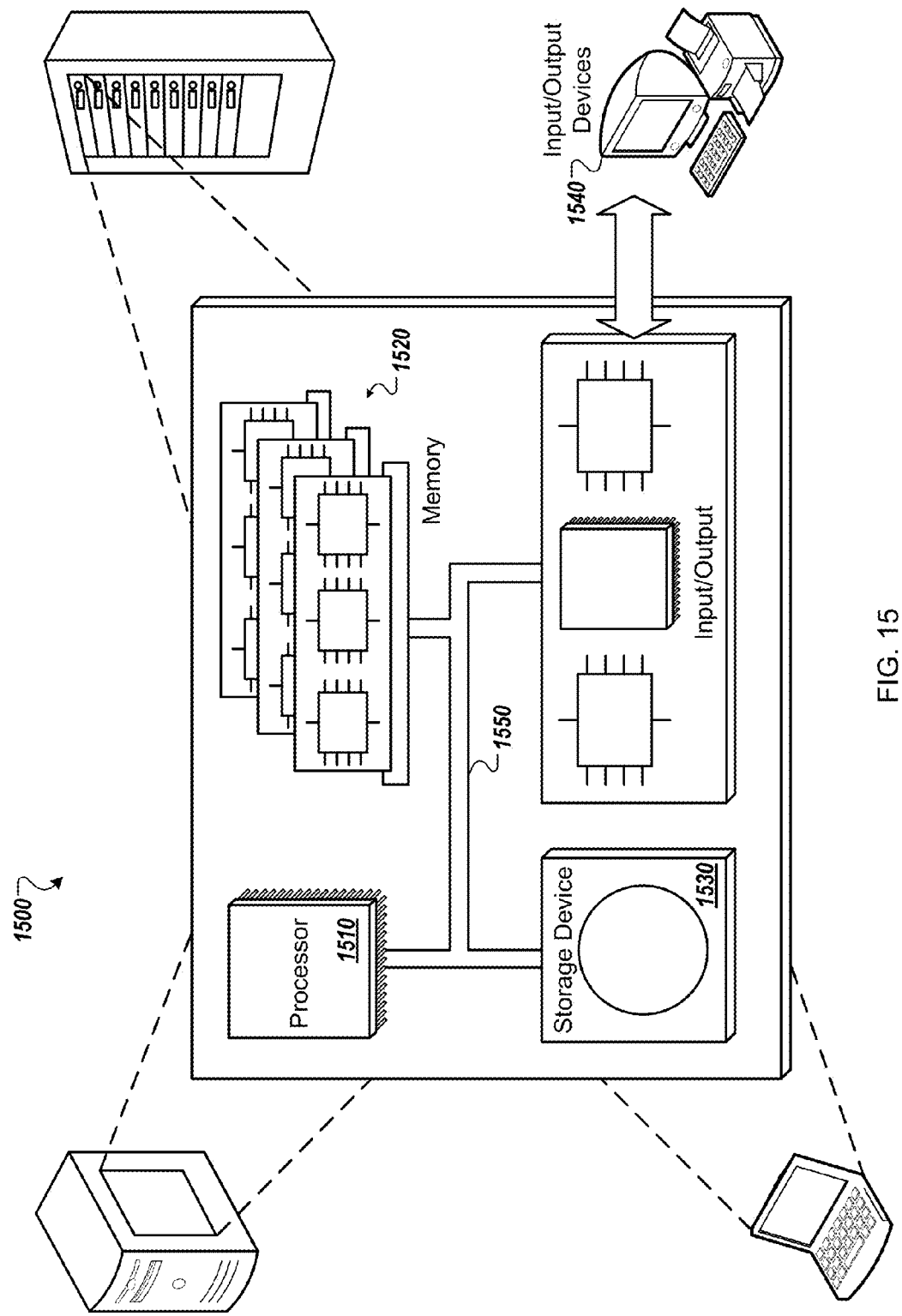

FIG. 15 is a schematic diagram of an example of a generic computer system 1500. The system 1500 can be used for the operations described in association with the processes 300, 600, 700, 800, 1100, and 1200, according to one implementation. For example, the system 1500 may be included in either or all of the server system 210, the server 208, and the remote user device 212.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In one implementation, the memory 1520 is a computer-readable medium. In one implementation, the memory 1520 is a volatile memory unit. In another implementation, the memory 1520 is a non-volatile memory unit.

The storage device 1530 is capable of providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method comprising:
monitoring, over time, play sequence changes made by a user of a content delivery network;
based on the monitoring, tracking data descriptive of the play sequence changes made by the user over time;
inferring play sequence preferences for the user based on the tracked data descriptive of the play sequence changes made by the user over time;
identifying a channel subscribed to by the user of the content delivery network;
receiving, from a content curator that manages the channel, input defining play sequence data for the channel, the play sequence data for the channel defining one or more rules used in determining an order to play content files on the channel;
controlling display of the channel based on the play sequence data and the inferred play sequence preferences for the user.

2. The method of claim 1, further comprising:
identifying a particular play sequence policy defined for the user;
comparing the particular play sequence policy defined for the user with the inferred play sequence preferences for the user;
based on the comparison, determining whether the particular play sequence policy defined for the user corresponds to the inferred play sequence preferences for the user; and
in response to a determination that the particular play sequence policy defined for the user does not correspond to the inferred play sequence preferences for the user, suggesting that the user change the particular play sequence policy defined for the user to a different play sequence policy that corresponds to the inferred play sequence preferences for the user.

3. The method of claim 1, further comprising:
identifying a particular play sequence policy defined for the user;
comparing the particular play sequence policy defined for the user with the inferred play sequence preferences for the user;
based on the comparison, determining whether the particular play sequence policy defined for the user corresponds to the inferred play sequence preferences for the user; and
in response to a determination that the particular play sequence policy defined for the user does not correspond to the inferred play sequence preferences for the user, automatically, without user intervention, changing the particular play sequence policy defined for the user to a different play sequence policy that corresponds to the inferred play sequence preferences for the user.

4. The method of claim 1:
wherein tracking data descriptive of the play sequence changes made by the user over time comprises tracking changes the user makes to order of content files included in channels; and
wherein inferring play sequence preferences for the user based on the tracked data descriptive of the play sequence changes made by the user over time comprises:
comparing the changes the user makes to order of content files included in channels with multiple play sequence policies;
based on the comparison, determining whether the changes the user makes to order of content files included in channels correspond to a particular play sequence policy included in the multiple play sequence policies; and
inferring that the user prefers the particular play sequence policy in response to a determination that the changes the user makes to order of content files included in channels correspond to the particular play sequence policy.

5. The method of claim 1, wherein controlling display of the channel based on the play sequence data and the inferred play sequence preferences for the user comprises:
 comparing the play sequence data to the inferred play sequence preferences for the user; and
 determining a play sequence for the user for the channel based on the comparison.

6. The method of claim 5, wherein determining the play sequence for the user for the channel based on the comparison comprises modifying the play sequence data for the channel when the comparison reveals that the inferred play sequence preferences of the user differ from the play sequence data.

7. The method of claim 5, wherein determining the play sequence for the user for the channel based on the comparison comprises weighting the play sequence data higher than the inferred play sequence preferences of the user in at least one instance of determining the play sequence for the user for the channel.

8. The method of claim 5, wherein determining the play sequence for the user for the channel based on the comparison comprises:
 identifying one or more instances in which the comparison reveals that the inferred play sequence preferences of the user differ from the play sequence data;
 identifying one or more instances in which the comparison reveals that default play sequence settings automatically set for the user differ from the play sequence data;
 modifying the play sequence data based on the inferred play sequence preferences of the user for the one or more instances in which the comparison reveals that the inferred play sequence preferences of the user differ from the play sequence data; and
 maintaining the play sequence data for the one or more instances in which the comparison reveals that the default play sequence settings automatically set for the user differ from the play sequence data.

9. The method of claim 1, further comprising:
 receiving, from the user, input defining one or more play sequence modifications for the channel; and
 wherein controlling display of the channel based on the play sequence data and the inferred play sequence preferences for the user comprises controlling display of the channel based on the one or more play sequence modifications.

10. The method of claim 1:
 wherein monitoring, over time, play sequence changes made by the user of the content delivery network comprises monitoring, over time, play sequence changes made by the user of the content delivery network by genre;
 wherein tracking data descriptive of the play sequence changes made by the user over time comprises tracking data descriptive of the play sequence changes made by the user over time by genre;
 wherein inferring play sequence preferences for the user based on the tracked data descriptive of the play sequence changes made by the user over time comprises inferring play sequence preferences for the user by genre based on the tracked data descriptive of the play sequence changes made by the user over time by genre;
 wherein receiving, from the content curator that manages the channel, input defining play sequence data for the channel comprises receiving, from the content curator that manages the channel, input defining a play sequence policy for a particular genre; and wherein controlling display of the channel based on the play sequence data and the inferred play sequence preferences for the user comprises:
 identifying that the channel corresponds to the particular genre,
 accessing, from the inferred play sequence preferences for the user, inferred play sequence preferences for the user for the particular genre, and
 controlling display of the channel based on the play sequence policy for the particular genre and the accessed play sequence preferences for the user for the particular genre.

11. A system comprising:
at least one computer; and
at least one computer-readable medium coupled to the at least one computer having instructions stored thereon which, when executed by the at least one computer, causes the at least one computer to perform operations comprising:
 monitoring, over time, play sequence changes made by a user of a content delivery network;
 based on the monitoring, tracking data descriptive of the play sequence changes made by the user over time;
 inferring play sequence preferences for the user based on the tracked data descriptive of the play sequence changes made by the user over time;
 identifying a channel subscribed to by the user of the content delivery network;
 receiving, from a content curator that manages the channel, input defining play sequence data for the channel, the play sequence data for the channel defining one or more rules used in determining an order to play content files on the channel;
 controlling display of the channel based on the play sequence data and the inferred play sequence preferences for the user.

12. The system of claim 11, wherein the operations further comprise:
 identifying a particular play sequence policy defined for the user;
 comparing the particular play sequence policy defined for the user with the inferred play sequence preferences for the user;
 based on the comparison, determining whether the particular play sequence policy defined for the user corresponds to the inferred play sequence preferences for the user; and
 in response to a determination that the particular play sequence policy defined for the user does not correspond to the inferred play sequence preferences for the user, suggesting that the user change the particular play sequence policy defined for the user to a different play sequence policy that corresponds to the inferred play sequence preferences for the user.

13. The system of claim 11, wherein the operations further comprise:
 identifying a particular play sequence policy defined for the user;
 comparing the particular play sequence policy defined for the user with the inferred play sequence preferences for the user;
 based on the comparison, determining whether the particular play sequence policy defined for the user corresponds to the inferred play sequence preferences for the user; and
 in response to a determination that the particular play sequence policy defined for the user does not correspond to the inferred play sequence preferences for the user, automatically, without user intervention, changing the particular play sequence policy defined for the user to a different play sequence policy that corresponds to the inferred play sequence preferences for the user.

14. The system of claim 11:
wherein tracking data descriptive of the play sequence changes made by the user over time comprises tracking changes the user makes to order of content files included in channels; and
wherein inferring play sequence preferences for the user based on the tracked data descriptive of the play sequence changes made by the user over time comprises:
  comparing the changes the user makes to order of content files included in channels with multiple play sequence policies;
  based on the comparison, determining whether the changes the user makes to order of content files included in channels correspond to a particular play sequence policy included in the multiple play sequence policies; and
  inferring that the user prefers the particular play sequence policy in response to a determination that the changes the user makes to order of content files included in channels correspond to the particular play sequence policy.

15. The system of claim 11, wherein controlling display of the channel based on the play sequence data and the inferred play sequence preferences for the user comprises:
  comparing the play sequence data to the inferred play sequence preferences for the user; and
  determining a play sequence for the user for the channel based on the comparison.

16. The system of claim 15, wherein determining the play sequence for the user for the channel based on the comparison comprises modifying the play sequence data for the channel when the comparison reveals that the inferred play sequence preferences of the user differ from the play sequence data.

17. The system of claim 15, wherein determining the play sequence for the user for the channel based on the comparison comprises weighting the play sequence data higher than the inferred play sequence preferences of the user in at least one instance of determining the play sequence for the user for the channel.

18. The system of claim 15, wherein determining the play sequence for the user for the channel based on the comparison comprises:
  identifying one or more instances in which the comparison reveals that the inferred play sequence preferences of the user differ from the play sequence data;
  identifying one or more instances in which the comparison reveals that default play sequence settings automatically set for the user differ from the play sequence data;
  modifying the play sequence data based on the inferred play sequence preferences of the user for the one or more instances in which the comparison reveals that the inferred play sequence preferences of the user differ from the play sequence data; and
  maintaining the play sequence data for the one or more instances in which the comparison reveals that the default play sequence settings automatically set for the user differ from the play sequence data.

19. The system of claim 11, wherein the operations further comprise:
  receiving, from the user, input defining one or more play sequence modifications for the channel; and
  wherein controlling display of the channel based on the play sequence data and the inferred play sequence preferences for the user comprises controlling display of the channel based on the one or more play sequence modifications.

20. The system of claim 11:
wherein monitoring, over time, play sequence changes made by the user of the content delivery network comprises monitoring, over time, play sequence changes made by the user of the content delivery network by genre;
wherein tracking data descriptive of the play sequence changes made by the user over time comprises tracking data descriptive of the play sequence changes made by the user over time by genre;
wherein inferring play sequence preferences for the user based on the tracked data descriptive of the play sequence changes made by the user over time comprises inferring play sequence preferences for the user by genre based on the tracked data descriptive of the play sequence changes made by the user over time by genre;
wherein receiving, from the content curator that manages the channel, input defining play sequence data for the channel comprises receiving, from the content curator that manages the channel, input defining a play sequence policy for a particular genre; and
wherein controlling display of the channel based on the play sequence data and the inferred play sequence preferences for the user comprises:
  identifying that the channel corresponds to the particular genre,
  accessing, from the inferred play sequence preferences for the user, inferred play sequence preferences for the user for the particular genre, and
  controlling display of the channel based on the play sequence policy for the particular genre and the accessed play sequence preferences for the user for the particular genre.

* * * * *